(12) United States Patent
Wang et al.

(10) Patent No.: US 10,780,619 B2
(45) Date of Patent: Sep. 22, 2020

(54) CONTINUOUS PRODUCTION DEVICE AND METHOD FOR GLASS FIBER REINFORCED TAPE POLYETHYLENE COMPOSITE PIPE

(71) Applicant: Qingzhao Wang, Shandong (CN)

(72) Inventors: Qingzhao Wang, Shandong (CN);
Dapeng Wang, Shandong (CN);
Shengxue Qin, Shandong (CN);
Zhanhuan Zhang, Shandong (CN)

(73) Assignee: Qingzhao Wang (CN)

( * ) Notice: Subject to any disclaimer, the term of this patent is extended or adjusted under 35 U.S.C. 154(b) by 107 days.

(21) Appl. No.: 16/317,042

(22) PCT Filed: Jul. 7, 2017

(86) PCT No.: PCT/CN2017/092136
§ 371 (c)(1),
(2) Date: Jan. 11, 2019

(87) PCT Pub. No.: WO2018/010599
PCT Pub. Date: Jan. 18, 2018

(65) Prior Publication Data
US 2019/0224901 A1      Jul. 25, 2019

(30) Foreign Application Priority Data

Jul. 15, 2016  (CN) .......................... 2016 1 0562332

(51) Int. Cl.
*B29C 53/68*        (2006.01)
*B29C 48/00*        (2019.01)
(Continued)

(52) U.S. Cl.
CPC ...... *B29C 48/0021* (2019.02); *B29C 48/0019* (2019.02); *B29C 48/0022* (2019.02);
(Continued)

(58) Field of Classification Search
None
See application file for complete search history.

(56) References Cited

U.S. PATENT DOCUMENTS 3,769,127 A  *  10/1973  Goldsworthy ........ B29C 70/525
156/172

FOREIGN PATENT DOCUMENTS

CN           201752933 U      3/2011
CN           102225622 A     10/2011
(Continued)

OTHER PUBLICATIONS

International Search Report for PCT/CN2017/092136.

*Primary Examiner* — Jeffry H Aftergut
(74) *Attorney, Agent, or Firm* — Schmeiser, Olsen & Watts, LLP

(57) ABSTRACT

Plastic pipes and a continuous production device and method for a glass fiber reinforced tape polyethylene composite pipe is provided. The main structure of the production device includes a first extruder, an inner pipe die, a vacuum sizing box, a first cooling spray box, a first tractor, a first winding machine, a first heater, a second winding machine, a second heater, an automatic tape replacing manipulator, an outer pipe extruder, an outer pipe extrusion die, an outer pipe cooling shaping die, a second cooling spray box, a second tractor, a meter counter, a fixed length cutting machine and finished pipe racks. The process of the production method totally includes four steps: inner pipe extrusion molding, continuous winding of the composite tape, outer pipe extrusion cladding, and cutting and warehousing, thus realizing the continuous on-line production of the glass fiber reinforced tape polyethylene composite pipe.

7 Claims, 3 Drawing Sheets

(51) Int. Cl.
  *B29D 23/00*    (2006.01)
  *B29C 48/18*    (2019.01)
  *B29C 53/56*    (2006.01)
  *B29C 53/80*    (2006.01)
  *B29C 70/30*    (2006.01)
  *B29C 53/58*    (2006.01)
  *B29C 53/84*    (2006.01)
  *B29C 70/32*    (2006.01)
  *B29C 48/09*    (2019.01)
  *B29K 309/08*   (2006.01)
  *B29L 23/00*    (2006.01)
  *F16L 9/16*     (2006.01)

(52) U.S. Cl.
  CPC ............ *B29C 48/18* (2019.02); *B29C 53/566* (2013.01); *B29C 53/582* (2013.01); *B29C 53/68* (2013.01); *B29C 53/8016* (2013.01); *B29C 53/8041* (2013.01); *B29C 53/845* (2013.01); *B29C 70/30* (2013.01); *B29C 70/32* (2013.01); *B29D 23/001* (2013.01); *B29C 48/09* (2019.02); *B29C 2793/009* (2013.01); *B29C 2793/0027* (2013.01); *B29K 2023/06* (2013.01); *B29K 2309/08* (2013.01); *B29L 2023/22* (2013.01); *F16L 9/16* (2013.01)

(56) References Cited

FOREIGN PATENT DOCUMENTS

| | | |
|---|---|---|
| CN | 202147408 U | 2/2012 |
| CN | 203818520 U | 9/2014 |
| CN | 104455791 A | 3/2015 |
| CN | 104690933 A | 6/2015 |
| CN | 105034339 A | 11/2015 |
| CN | 106182841 A | 12/2016 |
| JP | H0460292 A  | 2/1992 |

\* cited by examiner

CONTINUOUS PRODUCTION DEVICE AND METHOD FOR GLASS FIBER REINFORCED TAPE POLYETHYLENE COMPOSITE PIPE

CROSS-REFERENCE TO RELATED APPLICATIONS

This application claims priority to PCT Application No. PCT/CN2017/092136, having a filing date of Jul. 7, 2017, based on Chinese Application No. 201610562332.8, having a filing date of Jul. 15, 2016, the entire contents both of which are hereby incorporated by reference.

FIELD OF TECHNOLOGY

The following relates to the technical field of plastic pipes and, in particular, to a continuous production device and method for a glass fiber reinforced tape polyethylene composite pipe, which can realize the continuous on-line production of the inner pipe extrusion, glass fiber reinforced tape continuous winding, glass fiber reinforced tape on-line replacement and outer-layer cladding of the glass fiber reinforced tape/polyethylene composite pipe.

BACKGROUND

A Reinforced Thermoplastic Pipe (RTP), with focus on improving the resistance to internal pressure, usually consists of a three-layer structure: an outer protective layer which is made of various thermoplastics and generally is an HDPE layer with anti-aging and anti-ultraviolet properties. The middle layer is a reinforcing material layer staggered and entangled at a specific angle and its materials include aramid fiber, polyester fiber, glass fiber and steel wire. The common specifications of the RTP include 3 inch-15 Mpa, 4 inch-10 Mpa, and 5 inch-8 Mpa. The RTP can withstand a high pressure and its operating pressure can reach 32 Mpa (320 bar).

The RTP, with good flexibility, can be made into coils with a diameter of 200 mm or less and thus can be delivered, transported and laid over a long distance in a rapid and convenient way with extremely low construction cost. The RTP, with impact resistance, will not crack or leak even after a strong deformation. The RTP, with corrosion resistance, has a service life of more than 20 years even in a highly corrosive fluids environment. The RTP, with a low comprehensive cost and a wide scope of application, is suitable for medium- and long-distance transportation in the petroleum, natural gas, gas and chemical industries, etc. The patent documents concerning RTP production equipment and methods are as follows: the China Patent No. 201510504346.X discloses a processing method and equipment of a continuous fiber multilayer wound thermoplastic composite pipe; the processing equipment includes a continuous long fiber impregnated tape, a control device for installation and for controlling the axial and circular motions of the plastic inner pipe and a melt supply device for delivering molten plastic, and the front end of the melt supply device is provided with a slotted die head. The processing method comprises the following steps: during winding, the inner pipe moves along the axis while rotating. A press roller further promotes the inter-layer full fusion between the continuous long fiber impregnated tape and the thermoplastic plastic inner pipe through the pressurization, and cooling and shaping are performed by a subsequent cooling fan to complete single-layer winding. Then, the rotation direction of the inner pipe is changed when carrying out the winding of the next layer until the number of winding layers reaches the requirement. The melt supply device directly delivers the melt to the position between a continuous long fiber impregnated tape and a continuous long fiber impregnated tape, between the continuous long fiber impregnated tapes and the thermoplastic inner pipe, to function as a "binder." The China Patent No. 201410690683.8 discloses a long fiber tape-shaped internally wrapped type glass fiber wound three-layer composite polyethylene pipe, comprising three layers: an outer functional material layer, a middle long glass fiber strip-shaped polyethylene extrusion winding layer and an inner functional material layer, where the three layers are coaxially wrapped from the inside to the outside. In preparation, the inner pipe is produced first, the inner pipe is cut to a fixed length, the inner pipe moves along the axis while rotating, and the continuous long-fiber prepreg tape is wound on the inner pipe, and is heated and melted. The above patents both have the problems wherein the continuous on-line production of the inner pipe extrusion, composite tape winding and outer-layer coating cannot be achieved because the produced inner pipes both have a fixed length. The China patent No. 201310656110.9 discloses a method and device for producing a thermoplastic wound reinforced plastic composite pipe. The production device comprises an inner pipe extrusion module, a reinforcement layer winding module, an outer pipe extrusion module and a cutting module arranged in order from left to right. The inner pipe extrusion module is used for extruding a plastic inner pipe and the reinforcement layer winding module is used for winding a continuous fiber-reinforced thermoplastic composite material on the inner pipe to form a reinforcement layer and the outer pipe extrusion module is used for extruding an outer pipe and composite the outer pipe to the surface of the reinforcement layer The length of the continuous fiber-reinforced thermoplastic composite material of the reinforcement layer of the composite pipe directly restricts the length of the composite pipe. When the reinforcement material on the winding machine runs out, the production line must be shut down. The continuous fiber-reinforced thermoplastic composite material cannot be replaced online. Therefore, the continuous winding function for the reinforcement layer is not available and continuous production cannot be achieved. Thus, the research and development of a glass fiber reinforced tape polyethylene composite pipe production device and process with simple structure, practical function and continuous production have great social value and application prospects.

SUMMARY

An aspect relates to a glass fiber reinforced tape polyethylene composite pipe production device and process with simple structure, practical function and continuous production, thereby realizing the continuous on-line production of the inner pipe extrusion, glass fiber reinforced tape continuous winding, glass fiber reinforced tape on-line replacement and outer-layer cladding.

To achieve the aboveaspect, the main structure of a continuous production device for a glass fiber reinforced tape polyethylene composite pipe, according to embodiments of the present invention, comprises a first extruder, an inner pipe die, a vacuum sizing box, a first cooling spray box, a first tractor, a first winding machine, a first heater, a second winding machine, a second heater, an automatic tape replacing manipulator, an outer pipe extruder, an outer pipe extrusion die, an outer pipe cooling shaping die, a second cooling spray box, a second tractor, a meter counter, a fixed length cutting machine and finished pipe racks; pipeline connections are carried out between the inner pipe die and the vacuum sizing box. Between the vacuum sizing box and the first cooling spray box, between the first cooling spray box and the first tractor, between the first tractor and the first winding machine, between the first winding machine and the first heater, between the first heater and the second winding machine, between the second winding machine and the second heater, between the second heater and the outer pipe extrusion die, between the outer pipe cooling shaping die and the second cooling spray box, between the second cooling spray box and the second tractor, between the second tractor and the meter counter, between the meter counter and the fixed length cutting machine, and between the fixed length cutting machine and the finished pipe racks. Direct connections are carried out between the first extruder and the inner pipe die, between the first winding machine and the automatic tape replacing manipulator, between the second winding machine and the automatic tape replacing manipulator, between the outer pipe extruder and the outer pipe extrusion die, and between the outer pipe extrusion die and the outer pipe cooling shaping die. The inner diameter of the outer pipe extrusion die is 1-3 mm greater than the inner diameter of the outer pipe cooling shaping die. The first extruder, the inner pipe die, the vacuum sizing box, the first cooling spray box and the first tractor compose an inner pipe extrusion molding module; the first winding machine, the first heater, the second winding machine, the second heater and the automatic tape replacement manipulator compose a reinforced tape continuous winding module. The outer pipe extruder, the outer pipe extrusion die, the outer pipe cooling shaping die, the second cooling spray box and the second tractor compose an outer pipe extrusion cladding module. The meter counter, the fixed length cutting machine and the finished pipe racks compose the cutting and warehousing module. The inner pipe extrusion molding module, the reinforced tape continuous winding module, the outer pipe extrusion cladding module and the cutting and warehousing module are arranged in sequence and combined to constitute the continuous production device for a glass fiber reinforced tape polyethylene composite pipe.

The main structures of the first winding machine and the second winding machine according to embodiments of the present invention are the same. Each includes a winding machine base, a motor, a large plate, a tooth plate, a straightening press roller set, a bracket, tape feeders, tape guide machines, spring press sheets, hinges, dividing rulers, clamping rollers and signal transmitters. The motor is arranged at the bottom of the winding machine base of a U-shaped structure; the large plate which is of a circular plate-shaped structure is erected between the two ends of the winding machine base; the tooth plate is arranged on the outer edge of the large plate; the motor and the tooth plate are meshed together and the motor drives the tooth plate to rotate. The straightening press roller set which is of a ring-shaped structure is arranged at the center of the large plate. The straightening press roller set is composed of round rollers and the number of the circular rollers depends on the number of composite tapes wound at the same time. The straightening press roller set clamps and straightens the inner pipe and presses the composite tapes wound on the inner pipe so that the composite tapes are wound tightly on the inner pipe. One end of the straightening press roller set is connected to the ground through the bracket. There are 2-12 tape feeders and 1-6 tape guide machines arranged on the circumference of the large plate at equal intervals. Every two of the tape feeders and one tape guide machine work together to form a tape feeding and guiding module. When one of the two tape feeders in each tape feeding and guiding module is running, the other one is standby. The tape feeders are vertically connected with the large plate; two spring press sheets which are symmetrical in structure are arranged at the front end of each tape feeder. When the composite tapes are placed on the tape feeders, the spring press sheets are tightly pressed by the composite tapes and then fix the composite tapes on the tape feeders. In the case of replacement of composite tapes, the empty composite tapes press the spring press sheets flat, which facilitate the easy removal of the empty composite tapes from the tape feeders. After new composite tapes are placed on the tape feeders, the spring press sheets are in a pressed state and fix the composite tapes on the tape feeders. A signal transmitter is arranged at the end of each tape feeder; the tape guide machines are connected with the large plate through the hinges, and the dividing rulers are arranged on the large plate at the positions connected with the tape guide machines. The scales on the dividing rulers correspond to the tilt angles of the tape guide machines, which facilitate the adjustment of the angles between the tape guide machines and the large plate. The tilt angles of the tape guide machines are selected according to the winding angles of the composite tapes. Two clamping rollers which are symmetrical in structure are arranged on each tape guide machine and used to clamp the composite tapes. The clamping rollers are in a clamping state in the process of automatic replacement of the composite tapes.

The first heater and the second heater according to embodiments of the present invention have the same main structure and both have heating and cooling functions. Infrared heating is used during heating and a cold air blower is used during cooling. The first heater and the second heater are in a heating state in the production process. After the production is completed, the first heater and the second heater stop heating and start cooling, so that the surfaces of the first heater and the second heater and pipelines are cooled to room temperature to prevent the problem that causes the inner pipe staying in the first heater. The second heaters and the pipelines collapse under a high temperature environment, resulting in the inner pipe being unable to continue to be used or even causing a fire.

The main structure of the automatic tape replacing manipulator 10 according to embodiments of the present invention comprises a base plate, a lower rail, a lower slider, an upright, a bracket, an upper slideway, an upper slider, a connecting shaft, a gripper and a signal receiver. The two base plates which are of a rectangular plate shape are fixedly connected by the lower rail which is of a rectangular strip structure; the signal receiver is arranged on one of the two base plates; the lower slider which is of a rectangular hollow structure is connected to the lower rail in a sleeving manner. the lower slider moves horizontally on the lower rail; the top of the lower slider is provided with the upright which is of a cylindrical hollow structure. One end of the bracket which is of a rectangular strip structure is nested inside the upright, the bracket rotates in the upright and the other end of the bracket is vertically connected with the upper slideway which is of an L-shaped strip structure. The upper slider which is of a rectangular hollow structure is connected to the upper sideway in a sleeving manner. The upper slide moves horizontally on the upper slideway and the bottom of the upper slide is provided with the connecting shaft which is of a cylindrical structure. One end of the connecting shaft is provided with the gripper which is of an arc-shaped structure. The connecting shaft and the gripper rotate about the upper slider serving as a fulcrum.

The first extruder and the outer pipe extruder according to embodiments of the present invention are both single-screw extruders. The first winding machine, the first heater, the second winding machine and the second heater are set according to the number of winding layers. When the number of winding layers is 2, a first winding machine, a first heater, a second winding machine and a second heater are sequentially arranged. When the number of winding layers is 4, a first winding machine, a first heater, a second winding machine, a second heater, a third winding machine, a third heater, a fourth winding machine, and a fourth heater are sequentially arranged. The winding machines and the heaters are arranged in the same pattern when the number of winding layers is 6, 8, and 10, and the winding directions of the adjacent winding machines are opposite. The outer pipe extrusion die is directly connected with the outer pipe cooling shaping die, so that the glass fiber reinforced tape polyethylene composite pipe is directly shaped in the outer pipe cooling shaping die and further cooled in the second cooling spray box and the inner diameter of the outer pipe extrusion die is 1-3 mm larger than the inner diameter of the outer pipe cooling shaping die, so that the glass fiber reinforced tape polyethylene composite pipe is compacted in the outer pipe cooling shaping die. The composite effect of the glass fiber reinforced tape polyethylene composite pipe is enhanced.

The process of the continuous production method of a glass fiber reinforced tape polyethylene composite pipe according to embodiments of the present invention comprises four steps: inner pipe extrusion molding, continuous winding of the composite tape, outer pipe extrusion cladding, and cutting and warehousing.

(I) Inner pipe extrusion molding: the first extruder extrudes an inner pipe under the condition that the temperatures of four heating zones are 100° C., 130° C., 150° C. and 170° C., respectively. The nose temperature is 170° C., and the extrusion speed is 0.5-3 m/min. The inner pipe is successively subjected to the molding of the inner pipe die. The sizing of the vacuum sizing box and the cooling and shaping of the first cooling spray box then enter the first winding machine under the traction of the first tractor, where the traction speed of the first tractor is matched with the inner pipe extrusion speeds of the first extruder and the inner pipe die.

(II) Continuous winding of the composite tape: the first winding machine winds the first layer of the composite tape at the periphery of the inner pipe at a winding angle of 54°-63° and then the inner pipe is heated by the first heater so that the first layer of the composite tape and the inner pipe are fused together. Then, the second winding machine winds the second layer of the composite tape in an opposite direction at the periphery of the first layer of the composite tape at a winding angle of 54-63° and then the inner pipe is heated by the second heater so that the second layer of the composite tape and the first layer of the composite tape and the inner pipe are fused together and the inner pipe wound with the composite tape enters the outer pipe extrusion die.

In the process of winding the composite tape, a backup composite tape is placed on a standby tape feeder. When the composite tape on a tape feeder is about to be used up, the signal transmitter sends a tape replacement signal, and the signal receiver on the automatic tape replacing manipulator receives the tape replacement signal. When the horizontal distance between the signal transmitter and the signal receiver is 2-4 m, the automatic tape replacing manipulator starts working. The gripper holds the backup composite tape, the lower slider slides along the lower rail and the bracket rotates counterclockwise for 90° along its axis, so that the axis of the backup composite tape held by the gripper coincides with the axis of the tape feeder. After the upper slider moves 200 mm along the upper slideway, the gripper places the backup composite tape on the tape feeder, and then the composite tape is pulled out from a rape roll and attached to the backup composite tape, and the overlapping portion of the composite tape and the backup composite tape are greater than half of the circumference of the inner pipe. The signal transmitter stops transmitting the tape replacement signal and the automatic tape replacement manipulator comes back to its original position and stops working, thus completing the automatic replacement of the composite tape and achieving continuous winding of the composite tape.

The number of winding layers of the first winding machine and the second winding machine are both 2, 4, 6, 8 or 10. The number of winding layers is selected according to the pressure level. The winding directions of the adjacent winding layers are opposite and the number of winding machines depends on the number of winding layers. The number of composite tapes wound on a winding machine simultaneously is calculated according to the formula $n=(\pi \times D \times \cos \alpha)/L$, where n represents the number of composite tapes wound on the winding machine simultaneously, D represents the outer diameter of the inner pipe, and L represents the width of the composite tape, and $\alpha$ is the winding angle. The tape replacing speed of the automatic tape replacing manipulator matches the winding speeds of the first winding machine and the second winding machine so that the automatic tape replacing manipulator exactly completes the replacement of the composite tape when the large plate is rotated to the corresponding position.

(III) Outer pipe extrusion cladding: the outer pipe extruder extrudes an outer pipe under the condition that the temperatures of the four heating zones are 100° C., 130° C., 150° C. and 170° C., respectively. The nose temperature is 170° C., and the extrusion speed is 0.5-3 m/min. The outer pipe extruded by the outer pipe extruder is clad with the wound and melted inner pipe in the outer pipe extrusion die. The outer pipe, the glass fiber layer and the inner pipe are melted to form a fully fusion-bonded type glass fiber reinforced tape polyethylene composite pipe and then the glass fiber reinforced tape polyethylene composite pipe in turn undergoes the compression, cooling and shaping of the outer pipe cooling shaping die and further cooling and shaping of the second cooling spray box and then enters the meter counter under the traction of the second tractor.

(IV) Cutting and warehousing: the fixed length cutting machine cuts the glass fiber reinforced tape polyethylene composite pipe according to a set length and data metered by the meter counter, and the cut glass fiber reinforced tape polyethylene composite pipes are then transferred to and stacked orderly on the finished pipe racks in a warehouse and proper protective measures are carried out.

The glass fiber reinforced tape polyethylene composite pipe prepared by the continuous production method for the glass fiber reinforced tape polyethylene composite pipe according to embodiments of the present invention comprises an inner pipe, a reinforcement layer and an outer pipe, and the inner pipe and the outer pipe are both made of polyethylene. The thickness and width of the reinforcement layer are 0.8-8 mm and 100-300 mm, respectively. The reinforcement layer is formed by winding and compositing the glass fiber-reinforced polyethylene composite tapes. The glass fibers in the composite tapes are bundled continuous long glass fibers and the strength of each bundle of glass fibers is greater than 0.5N/dTEX. The retention of the strength of each bundle of glass fibers is greater than 90%. The continuous long glass fibers are treated with a coupling agent, the glass fiber monofilaments are bonded to each other and the glass fiber is bonded to the polyethylene.

Compared with the known art, embodiments of the present invention has the advantage that since the outer pipe extrusion die and the outer pipe cooling shaping die are directly connected, the cooling shaping effect is good, the vacuum sizing process in the traditional production process of the composite pipe is omitted, and the layering phenomenon of a composite layer caused by the vacuum sizing of the composite pipe is prevented. The automatic tape replacing manipulator is used in combination with the winding machines to complete the automatic continuous replacement of the composite tape. Under the heating condition of the heaters, the polyethylene of the inner pipe and the outer pipe and the polyethylene of the composite tape are fused together to form a fully fusion-bonded glass fiber reinforced tape polyethylene composite pipe. The continuous on-line production of the glass fiber reinforced tape polyethylene composite pipe is realized and the production leftovers of the glass fiber reinforced tape polyethylene composite pipe can be recycled to prepare a long glass fiber reinforced polyethylene material whose production device is environmentally friendly, the principle of its production method is scientific and reasonable and the produced glass fiber reinforced tape polyethylene composite pipe has high compression strength, thin wall thickness, low production cost, energy saving and environmental friendliness.

BRIEF DESCRIPTION OF THE DRAWINGS

Some of the embodiments will be described in detail, with references to the following Figures, wherein like designations denote like members, wherein.

DETAILED DESCRIPTION OF THE PREFERRED EMBODIMENTS

Embodiment 1

Figure 1:
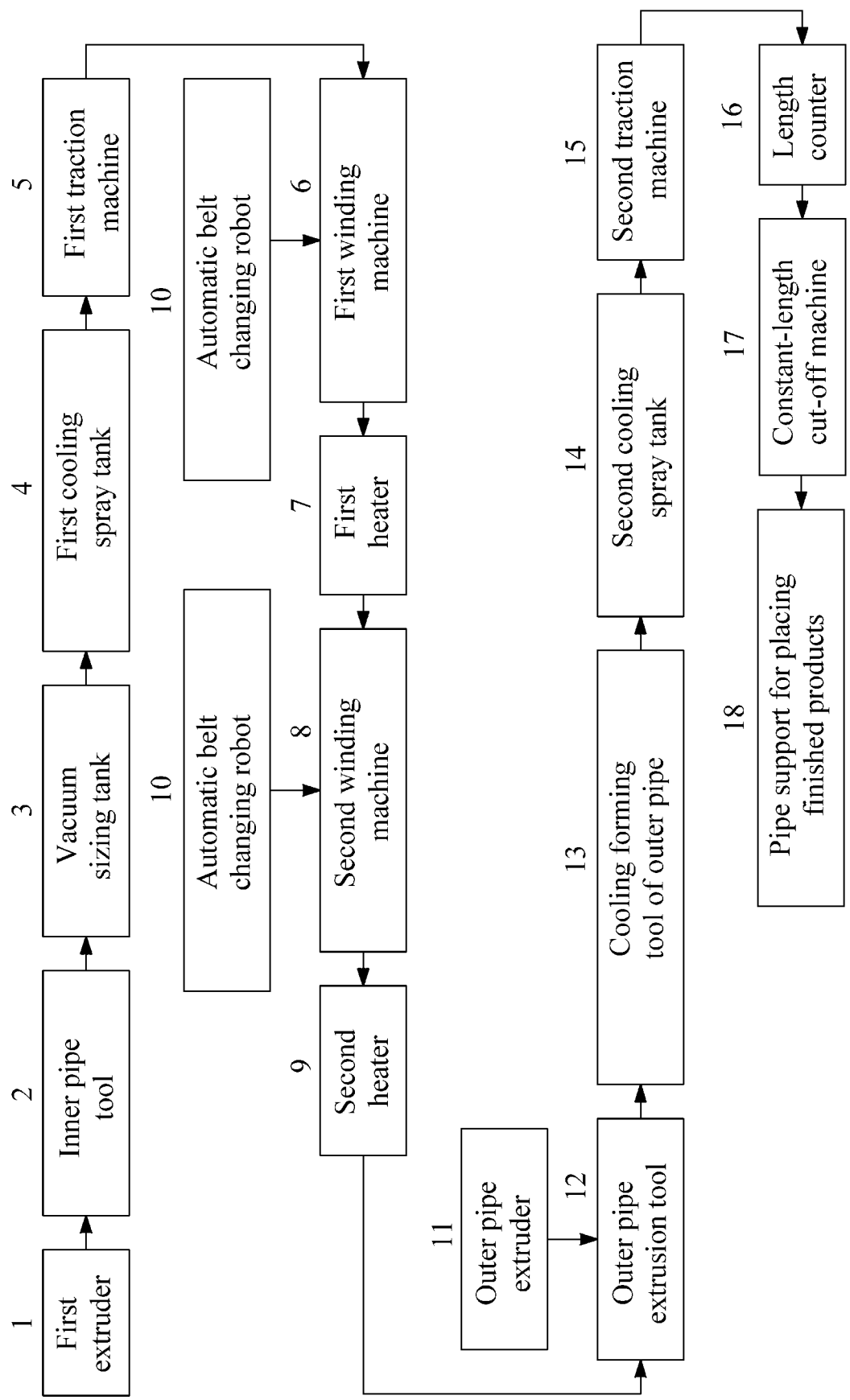
FIG. 1 is a schematic diagram of a main structure according to embodiments of the present invention.
Figure 2:
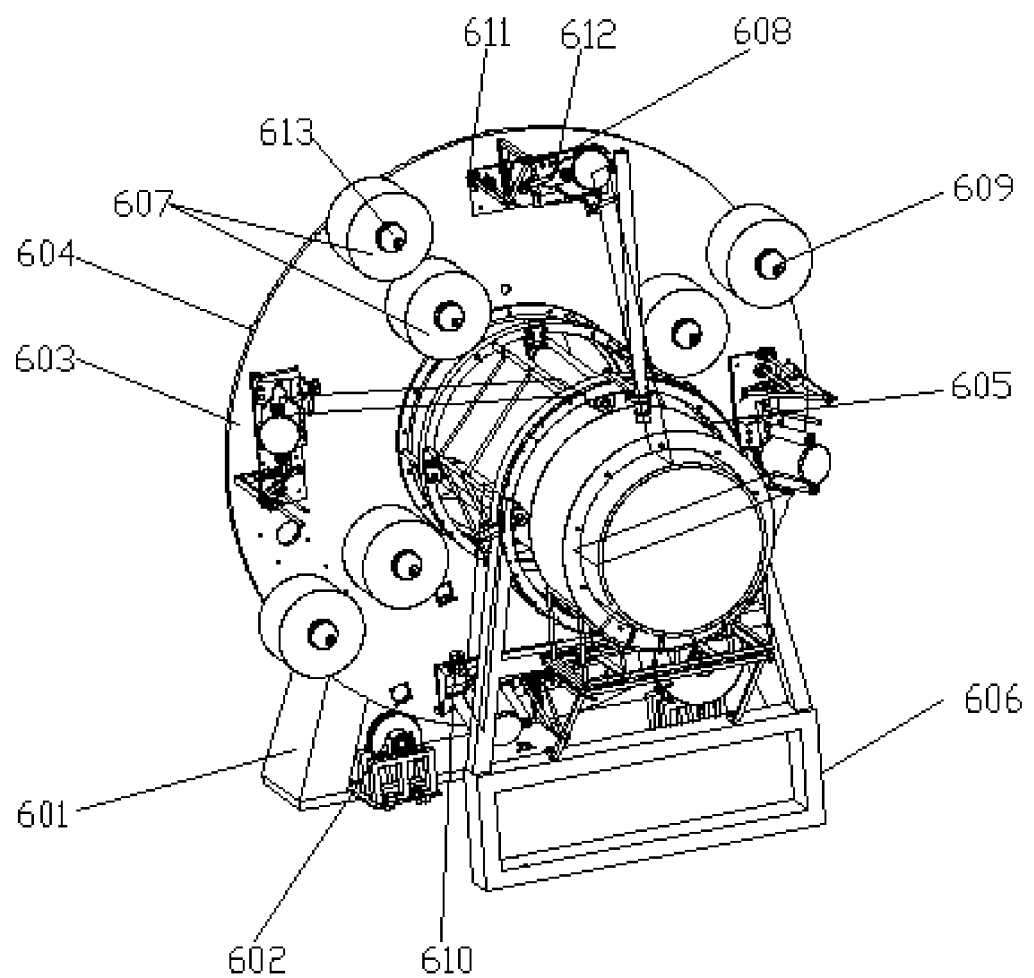
FIG. 2 is a schematic diagram of the structure principle of a winding machine according to embodiments of the present invention.
Figure 3:
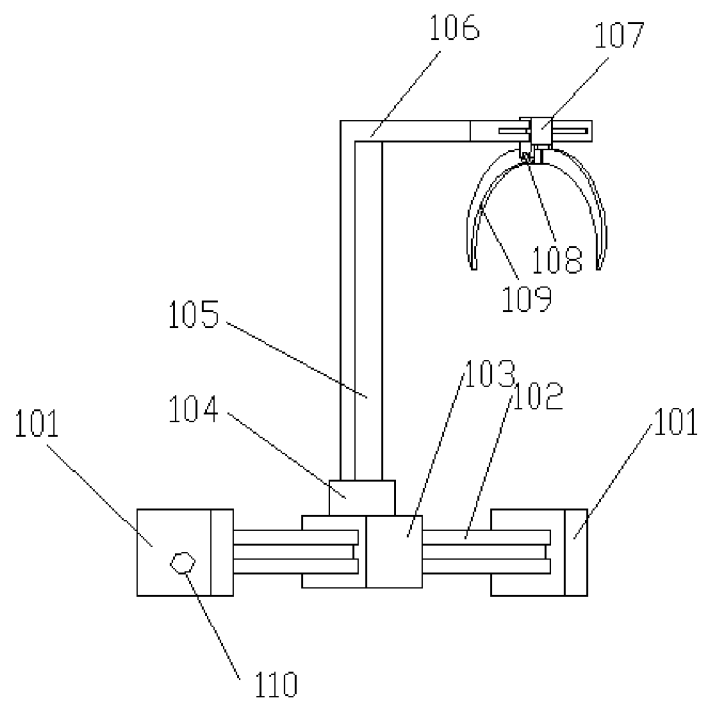
FIG. 3 is a schematic diagram of the structure principle of an automatic tape replacing manipulator according to embodiments of the present invention.

The main structure of a continuous production device for a glass fiber reinforced tape polyethylene composite pipe, according to this embodiment comprises a first extruder 1, an inner pipe die 2, a vacuum sizing box 3, a first cooling spray box 4, a first tractor 5, a first winding machine 6, a first heater 7, a second winding machine 8, a second heater 9, an automatic tape replacing manipulator 10, an outer pipe extruder 11, an outer pipe extrusion die 12, an outer pipe cooling shaping die 13, a second cooling spray box 14, a second tractor 15, a meter counter 16, a fixed length cutting machine 17 and finished pipe racks 18. Pipeline connections are carried out between the inner pipe die 2 and the vacuum sizing box 3, between the vacuum sizing box 3 and the first cooling spray box 4, between the first cooling spray box 4 and the first tractor 5, between the first tractor 5 and the first winding machine 6, between the first winding machine 6 and the first heater 7, between the first heater 7 and the second winding machine 8, between the second winding machine 8 and the second heater 9, between the second heater 9 and the outer pipe extrusion die 12, between the outer pipe cooling shaping die 13 and the second cooling spray box 14, between the second cooling spray box 14 and the second tractor 15, between the second tractor 15 and the meter counter 16, between the meter counter 16 and the fixed length cutting machine 17, and between the fixed length cutting machine 17 and the finished pipe racks 18. Direct connections are carried out between the first extruder 1 and the inner pipe die 2, between the first winding machine 6 and the automatic tape replacing manipulator 10, between the second winding machine 8 and the automatic tape replacing manipulator 10, between the outer pipe extruder 11 and the outer pipe extrusion die 12, and between the outer pipe extrusion die 12 and the outer pipe cooling shaping die 13; the inner diameter of the outer pipe extrusion die 12 is 1-3 mm greater than the inner diameter of the outer pipe cooling shaping die 13. The first extruder 1, the inner pipe die 2, the vacuum sizing box 3, the first cooling spray box 4 and the first tractor 5 compose an inner pipe extrusion molding module; the first winding machine 6, the first heater 7, the second winding machine 8, the second heater 9 and the automatic tape replacing manipulator 10 compose a reinforced tape continuous winding module; the outer pipe extruder 11, the outer pipe extrusion die 12, the outer pipe cooling shaping die 13, the second cooling spray box 14 and the second tractor 15 compose an outer pipe extrusion cladding module. The meter counter 16, the fixed length cutting machine 17 and the finished pipe racks 18 compose the cutting and warehousing module. The inner pipe extrusion molding module, the reinforced tape continuous winding module, the outer pipe extrusion cladding module and the cutting and warehousing module are arranged in sequence and combined to constitute the continuous production device for a glass fiber reinforced tape polyethylene composite pipe.

The main structures of the first winding machine 6 and the second winding machine 8 according to this embodiment are the same. Each includes a winding machine base 601, a motor 602, a large plate 603, a tooth plate 604, a straightening press roller set 605, a bracket 606, tape feeders 607, tape guide machines 608, spring press sheets 609, hinges 610, dividing rulers 611, clamping rollers 612 and signal transmitters 613. The motor 602 is arranged at the bottom of the winding machine base 601 which is of a U-shaped structure. The large plate 603 which is of a circular plate-shaped structure is erected between the two ends of the winding machine base 601. The tooth plate 604 is arranged on the outer edge of the large plate 603. The motor 602 and the tooth plate 604 are meshed together and the motor 602 drives the tooth plate 604 to rotate. The straightening press roller set 605 which is of a ring-shaped structure is arranged at the center of the large plate 603. The straightening press roller set 605 is composed of round rollers and the number of the circular rollers depends on the number of composite tapes wound at the same time. The straightening press roller set 605 clamps and straightens the inner pipe and presses the composite tapes wound on the inner pipe so that the composite tapes are wound tightly on the inner pipe. One end of the straightening press roller set 605 is connected to the ground through the bracket 606. There are 2-12 tape feeders 607 and 1-6 tape guide machines 608 arranged on the circumference of the large plate 603 at equal intervals. Every two of the tape feeders 607 and one tape guide machine 608 work together to form a tape feeding and guiding module.

When one of the two tape feeders 607 in each tape feeding and guiding module is running, the other one is on standby. The tape feeders 607 are vertically connected with the large plate. Two spring press sheets 609 which are symmetrical in structure are arranged at the front end of each tape feeder 607. When the composite tapes are placed on the tape feeders 607, the spring press sheets 609 are tightly pressed by the composite tapes and then fix the composite tapes on the tape feeders 607. In case of a replacement of the composite tapes, the empty composite tapes press the spring press sheets flat, which facilitate the easy removal of the empty composite tapes from the tape feeders. After new composite tapes are placed on the tape feeders 607, the spring press sheets 609 are in a pressed state and fix the composite tapes on the tape feeders 607. A signal transmitter 613 is arranged at the end of each tape feeder 607. The tape guide machines 608 are connected with the large plate 603 through the hinges 610 and the dividing rulers 611 are arranged on the large plate 603 at the positions connected with the tape guide machines 608. The scales on the dividing rulers 611 correspond to the tilt angles of the tape guide machines 608, which facilitate the adjustment of the angles between the tape guide machines 608 and the large plate 603. The tilt angles of the tape guide machines 608 are selected according to the winding angles of the composite tapes. Two clamping rollers 612 which are symmetrical in structure are arranged on each tape guide machine 608 and used to clamp the composite tapes. The clamping rollers 612 are in a clamping state in the process of automatic replacement of the composite tapes.

The first heater 7 and the second heater 9 according to this embodiment have the same main structure and both have heating and cooling functions. Infrared heating is used during heating and a cold air blower is used during cooling. The first heater 7 and the second heater 9 are in a heating state in the production process. After the production is completed, the first heater 7 and the second heater 9 stop heating and start cooling, so that the surfaces of the first heater 7 and the second heater 9 and pipelines are cooled to room temperature to prevent the problem of the inner pipe staying in the first heater 7, the second heaters 9 and the pipelines collapse under a high temperature environment, resulting in the inner pipe being unable to continue to be used or even causing a fire.

The main structure of the automatic tape replacing manipulator 10 according to this embodiment comprises a base plate 101, a lower rail 102, a lower slider 103, an upright 104, a bracket 105, an upper slideway 106, an upper slider 107, a connecting shaft 108, a gripper 109 and a signal receiver 110. The two base plates 101 which are of a rectangular plate shape are fixedly connected by the lower rail 102 which is of a rectangular strip structure. The signal receiver 110 is arranged on one of the two base plates 101. The lower slider 103 which is of a rectangular hollow structure is connected to the lower rail 102 in a sleeving manner. The lower slider 103 moves horizontally on the lower rail 102 and the top of the lower slider 103 is provided with the upright 104 which is of a cylindrical hollow structure. One end of the bracket 105 which is of a rectangular strip structure is nested inside the upright 104; the bracket 105 rotates in the upright 104, and the other end of the bracket 105 is vertically connected with the upper slideway 106 which is of an L-shaped strip structure. The upper slider 107 which is of a rectangular hollow structure is connected to the upper slideway 106 in a sleeving manner. The upper slide 107 moves horizontally on the upper slideway 106, the bottom of the upper slide 107 is provided with the connecting shaft 108 which is of a cylindrical structure. One end of the connecting shaft 108 is provided with the gripper 109 which is of an arc-shaped structure. The connecting shaft 108 and the gripper 109 rotate about the upper slider 107 serving as a fulcrum.

The first extruder 1 and the outer pipe extruder 11 according to this embodiment are both single-screw extruders. The first winding machine 6, the first heater 7, the second winding machine 8 and the second heater 9 are set according to the number of winding layers. When the number of winding layers is 2, a first winding machine 6, a first heater 7, a second winding machine 8 and a second heater 9 are sequentially arranged. When the number of winding layers is 4, a first winding machine 6, a first heater 7, a second winding machine 8, a second heater 9, a third winding machine, a third heater, a fourth winding machine, and a fourth heater are sequentially arranged. The winding machines and the heaters are arranged in the same pattern when the number of winding layers is 6, 8, and 10, and the winding directions of the adjacent winding machines are opposite. The outer pipe extrusion die 12 is directly connected with the outer pipe cooling shaping die 13, so that the glass fiber reinforced tape polyethylene composite pipe is directly shaped in the outer pipe cooling shaping die 13 and further cooled in the second cooling spray box 14. The inner diameter of the outer pipe extrusion die 12 is 1-3 mm, larger than the inner diameter of the outer pipe cooling shaping die 13, so that the glass fiber reinforced tape polyethylene composite pipe is compacted in the outer pipe cooling shaping die 13 and the composite effect of the glass fiber reinforced tape polyethylene composite pipe is enhanced.

Embodiment 2

The process of the continuous production method of a glass fiber reinforced tape polyethylene composite pipe according to this embodiment comprises four steps: inner pipe extrusion molding, continuous winding of the composite tape, outer pipe extrusion cladding, and cutting and warehousing.

(I) Inner pipe extrusion molding: the first extruder 1 is a JWS75/33 high-efficiency single-screw extruder; the first extruder 1 extrudes an inner pipe with the outer diameter of 105.4 mm under the condition that the temperatures of four heating zones are 100° C., 130° C., 150° C. and 170° C., respectively. The nose temperature is 170° C., and the inner pipe extrusion speed is 1 m/min. The inner pipe is successively subjected to the molding of the inner pipe die 2, the sizing of the vacuum sizing box 3 and the cooling and shaping of the first cooling spray box 4, and then enters the first winding machine 6 under the traction of the first tractor 5, where the traction speed of the first tractor 5 and the inner pipe extrusion speeds of the first extruder 1 and the inner pipe die 2 are all 1 m/min.

(II) Continuous winding of the composite tape: the first winding machine 6 winds the first layer of the composite tape at the periphery of the inner pipe at a winding angle of 63°, and then the inner pipe is heated by the first heater 7 so that the first layer of the composite tape and the inner pipe are fused together. Then, the second winding machine 8 winds the second layer of the composite tape in an opposite direction at the periphery of the first layer of the composite tape at a winding angle of 63°. Then the inner pipe is heated by the second heater 9 so that the second layer of the composite tape and the first layer of the composite tape and the inner pipe are fused together. The inner pipe wound with the composite tape enters the outer pipe extrusion die 12; the thickness and width of the composite tapes are 0.4 mm and 150 mm, respectively. The model of the glass fibers is 1200 TEX, the strength of each bundle of glass fibers is greater than 0.5N/dTEX and the retention rate of the strength of each bundle of glass fibers is greater than 90%.

In the process of winding the composite tape, a backup composite tape is placed on a standby tape feeder 607. When the composite tape on a tape feeder 607 is about to be used up, the signal transmitter 613 sends a tape replacing signal and the signal receiver 110 on the automatic tape replacing manipulator 10 receives the tape replacing signal. When the horizontal distance between the signal transmitter 613 and the signal receiver 110 is 2 m, the automatic tape replacing manipulator 10 starts working; the gripper 109 holds the backup composite tape, the lower slider 103 slides along the lower rail 102, and the bracket 105 rotates counterclockwise for 90° along its axis, so that the axis of the backup composite tape held by the gripper 109 coincides with the axis of the tape feeder. After the upper slider 107 moves 200 mm along the upper slideway 106, the gripper 109 places the backup composite tape on the tape feeder 607 and then the composite tape is pulled out from a tape roll and attached to the backup composite tape, and the overlapping portion of the composite tape and the backup composite tape is greater than 170 mm. The signal transmitter 613 stops transmitting the tape replacement signal and the automatic tape replacing manipulator 10 comes back to its original position and stops working, thus completing the automatic replacement of the composite tape and achieving continuous winding of the composite tape, wherein the number of the composite tapes wound by the first winding machine 6 and the winding machine 8 simultaneously is 1.

(III) Outer pipe extrusion cladding: the outer pipe extruder 11 extrudes an outer pipe with the thickness of 1.5 mm under the condition that the temperatures of the four heating zones are 100° C., 130° C., 150° C. and 170° C., respectively. The nose temperature is 170° C., the extrusion speed is 1 m/min. The outer pipe extruded by the outer pipe extruder 11 is clad with the wound and melted inner pipe art the outer pipe extrusion die 12 and the outer pipe, the glass fiber layer and the inner pipe are melted to form a fully fusion-bonded type glass fiber reinforced tape polyethylene composite pipe with the outer diameter of 110 mm. Then the glass fiber reinforced tape polyethylene composite pipe in turn undergoes the compression, cooling and shaping of the outer pipe cooling shaping die 13 and further cooling and shaping of the second cooling spray box 14 and then enters the meter counter 16 under the traction of the second tractor 15.

(IV) Cutting and warehousing: the fixed length cutting machine 17 cuts the glass fiber reinforced tape polyethylene composite pipe according to a set length and data measured by the meter counter 16, and the cut glass fiber reinforced tape polyethylene composite pipes are then transferred to and stacked orderly on the finished pipe racks 18 in a warehouse and proper protective measures are carried out.

Embodiment 3

The process of the continuous production method of a glass fiber reinforced tape polyethylene composite pipe according to this embodiment comprises four steps: inner pipe extrusion molding, continuous winding of the composite tape, outer pipe extrusion cladding, and cutting and warehousing.

(I) Inner pipe extrusion molding: the first extruder 1 is a JWS120/33 high-efficiency single-screw extruder. The first extruder 1 extrudes an inner pipe with the outer diameter of 273.6 mm under the condition that the temperatures of four heating zones are 100° C., 130° C., 150° C. and 170° C., respectively. The nose temperature is 170° C., and the inner pipe extrusion speed is 0.5 m/min. The inner pipe is successively subjected to the molding of the inner pipe die 2, the sizing of the vacuum sizing box 3 and the cooling and shaping of the first cooling spray box 4. It then enters the first winding machine 6 under the traction of the first tractor 5, where the traction speed of the first tractor 5 and the inner pipe extrusion speeds of the first extruder 1 and the inner pipe die 2 are all 0.5 m/min.

(II) Continuous winding of the composite tape: the first winding machine 6 winds the first layer of the composite tape at the periphery of the inner pipe at a winding angle of 58°. The inner pipe is then heated by the first heater so that the first layer of the composite tape and the inner pipe are fused together. Then, the second winding machine 8 winds the second layer of the composite tape in an opposite direction at the periphery of the first layer of the composite tape at a winding angle of 58°, and then the inner pipe is heated by the second heater 9 so that the second layer of the composite tape and the first layer of the composite tape and the inner pipe are fused together, and the inner pipe wound with the composite tape enters the outer pipe extrusion die 12. The thickness and width of the composite tapes are 0.6 mm and 300 mm, respectively. The model of the glass fibers is 2400 TEX, and the strength of each bundle of glass fibers is greater than 0.5N/Dtex. The retention rate of the strength of each bundle of glass fibers is greater than 90%, and the number of the composite tapes wound by the first winding machine 6 and the winding machine 8 simultaneously is 2.

In the process of winding the composite tape, a backup composite tape is placed on a standby tape feeder 607. When the composite tape on a tape feeder 607 is about to be used up, the signal transmitter 613 sends a tape replacement signal and the signal receiver 110 on the automatic tape replacing manipulator 10 receives the tape replacement signal. When the horizontal distance between the signal transmitter 613 and the signal receiver 110 is 3 m, the automatic tape replacing manipulator 10 starts working. The gripper 109 holds the backup composite tape, the lower slider 103 slides along the lower rail 102, and the bracket 105 rotates counterclockwise for 90° along its axis, so that the axis of the backup composite tape held by the gripper 109 coincides with the axis of the tape feeder. After the upper slider 107 moves 200 mm along the upper slideway 106, the gripper 109 places the backup composite tape on the tape feeder 607 and then the composite tape is pulled out from a rape roll and attached to the backup composite tape, and the overlapping portion of the composite tape and the backup composite tape is greater than 440 mm. The signal transmitter 613 stops transmitting the tape replacement signal and the automatic tape replacement manipulator 10 comes back to its original position and stops working, thus completing the automatic replacement of the composite tape and achieving continuous winding of the composite tape.

(III) Outer pipe extrusion cladding: the outer pipe extruder 11 extrudes an outer pipe with the thickness of 2.0 mm under the condition that the temperatures of the four heating zones are 100° C., 130° C., 150° C. and 170° C., respectively. The nose temperature is 170° C., the extrusion speed is 0.5 m/min. The outer pipe extruded by the outer pipe extruder 11 is clad with the wound and melted inner pipe in the outer pipe extrusion die 12, and the outer pipe, the glass fiber layer and the inner pipe are melted to form a fully fusion-bonded type glass fiber reinforced tape polyethylene composite pipe with the outer diameter of 280 mm. Then the glass fiber reinforced tape polyethylene composite pipe in turn undergoes the compression, cooling and shaping of the outer pipe cooling shaping die 13 and further cooling and shaping of the second cooling spray box 14 and then enters the meter counter 16 under the traction of the second tractor 15.

(IV) Cutting and warehousing: the fixed length cutting machine 17 cuts the glass fiber reinforced tape polyethylene composite pipe according to a set length and data measured by the meter counter 16, and the cut glass fiber reinforced tape polyethylene composite pipes are then transferred to and stacked orderly on the finished pipe racks 18 in a warehouse and proper protective measures are carried out.

Embodiment 4

The process of the continuous production method of a glass fiber reinforced tape polyethylene composite pipe according to this embodiment comprises four steps: inner pipe extrusion molding, continuous winding of the composite tape, outer pipe extrusion cladding, and cutting and warehousing.

(I) Inner pipe extrusion molding: the first extruder 1 is a JWS150/33 high-efficiency single-screw extruder; the first extruder 1 extrudes an inner pipe with the outer diameter of 985.2 mm under the condition that the temperatures of four heating zones are 100° C., 130° C., 150° C. and 170° C., respectively. The nose temperature is 170° C., and the inner pipe extrusion speed is 0.5 m/min. The inner pipe is successively subjected to the molding of the inner pipe die 2, the sizing of the vacuum sizing box 3 and the cooling and shaping of the first cooling spray box 4. It then enters the first winding machine 6 under the traction of the first tractor 5, where the traction speed of the first tractor 5 and the inner pipe extrusion speeds of the first extruder 1 and the inner pipe die 2 are all 0.5 m/min.

(II) Continuous winding of the composite tape: the first winding machine 6 winds the first layer of the composite tape at the periphery of the inner pipe at a winding angle of 54°. The inner pipe is then heated by the first heater 7 so that the first layer of the composite tape and the inner pipe are fused together; then, the second winding machine 8 winds the second layer of the composite tape in an opposite direction at the periphery of the first layer of the composite tape at a winding angle of 54°. The inner pipe is then heated by the second heater 9 so that the second layer of the composite tape and the first layer of the composite tape and the inner pipe are fused together, and the inner pipe wound with the composite tape enters the outer pipe extrusion die 12. The thickness and width of the composite tapes are 0.6 mm and 300 mm, respectively. The model of the glass fibers is 2400 TEX, and the strength of each bundle of glass fibers is greater than 0.5N/dTEX, the retention rate of the strength of each bundle of glass fibers is greater than 90% and the number of the composite tapes wound by the first winding machine 6 and the winding machine 8 simultaneously is 6.

In the process of winding the composite tape, a backup composite tape is placed on a standby tape feeder 607. When the composite tape on the tape feeder 607 is about to be used up, the signal transmitter 613 sends a tape replacement signal and the signal receiver 110 on the automatic tape replacing manipulator 10 receives the tape replacement signal. When the horizontal distance between the signal transmitter 613 and the signal receiver 110 is 4 m, the automatic tape replacement manipulator 10 starts working, the gripper 109 holds the backup composite tape, the lower slider 103 slides along the lower rail 102, and the bracket 105 rotates counterclockwise for 90° along its axis, so that the axis of the backup composite tape held by the gripper 109 coincides with the axis of the tape feeder. After the upper slider 107 moves 200 mm along the upper slideway 106, the gripper 109 places the backup composite tape on the tape feeder 607, and then the composite tape is pulled out from a tape roll and attached to the backup composite tape, and the overlapping portion of the composite tape and the backup composite tape is greater than 1570 mm. The signal transmitter 613 stops transmitting the tape replacement signal and the automatic tape replacing manipulator 10 comes back to its original position and stops working, thus completing the automatic replacement of the composite tape and achieving continuous winding of the composite tape.

(III) Outer pipe extrusion cladding: the outer pipe extruder extrudes an outer pipe with the thickness of 5.0 mm under the condition that the temperatures of the four heating zones are 100° C., 130° C., 150° C. and 170° C., respectively. The nose temperature is 170° C., and the extrusion speed is 0.5 m/min. The outer pipe extruded by the outer pipe extruder 11 is clad with the wound and melted inner pipe in the outer pipe extrusion die 12, and the outer pipe, the glass fiber layer and the inner pipe are melted to form a fully fusion-bonded type glass fiber reinforced tape polyethylene composite pipe with the outer diameter of 1000 mm. The glass fiber reinforced tape polyethylene composite pipe in turn undergoes the compression, cooling and shaping of the outer pipe cooling shaping die 13 and the further cooling and shaping of the second cooling spray box 14 and then enters the meter counter 16 under the traction of the second tractor 15.

(IV) Cutting and warehousing: the fixed length cutting machine 17 cuts the glass fiber reinforced tape polyethylene composite pipe according to a set length and data measured by the meter counter 16, and the cut glass fiber reinforced tape polyethylene composite pipes are then transferred to and stacked orderly on the finished pipe racks 18 in a warehouse and proper protective measures are carried out.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed is:

1. A continuous production device for a glass fiber reinforced tape polyethylene composite pipe, wherein the main structure includes a first extruder, an inner pipe die, a vacuum sizing box, a first cooling spray box, a first tractor, a first winding machine, a first heater, a second winding machine, a second heater, an automatic tape replacing manipulator, an outer pipe extruder, an outer pipe extrusion die, an outer pipe cooling shaping die, a second cooling spray box, a second tractor, a meter counter, a fixed length cutting machine and finished pipe racks, the pipeline connections are carried out between the inner pipe die and the vacuum sizing box, between the vacuum sizing box and the first cooling spray box, between the first cooling spray box and the first tractor, between the first tractor and the first winding machine, between the first winding machine and the first heater, between the first heater and the second winding machine, between the second winding machine and the second heater, between the second heater and the outer pipe extrusion die, between the outer pipe cooling shaping die and the second cooling spray box, between the second cooling spray box and the second tractor, between the second tractor and the meter counter, between the meter counter and the fixed length cutting machine, and between the fixed length cutting machine and the finished pipe racks; direct connections are carried out between the first extruder and the inner pipe die, between the first winding machine and the automatic tape replacing manipulator, between the second winding machine and the automatic tape replacing manipulator, between the outer pipe extruder and the outer pipe extrusion die, and between the outer pipe extrusion die and the outer pipe cooling shaping die; the inner diameter of the outer pipe extrusion die is 1-3 mm greater than the inner diameter of the outer pipe cooling shaping die; the first extruder, the inner pipe die, the vacuum sizing box, the first cooling spray box and the first tractor compose an inner pipe extrusion molding module; the first winding machine, the first heater, the second winding machine, the second heater and the automatic tape replacing manipulator compose a reinforced tape continuous winding module, the outer pipe extruder, the outer pipe extrusion die, the outer pipe cooling shaping die, the second cooling spray box and the second tractor compose an outer pipe extrusion cladding module, the meter counter, the fixed length cutting machine and the finished pipe racks compose the cutting and warehousing module; the inner pipe extrusion molding module, the reinforced tape continuous winding module, the outer pipe extrusion cladding module and the cutting and warehousing module are arranged in sequence and combined to constitute the continuous production device for a glass fiber reinforced tape polyethylene composite pipe.

2. The continuous production device for a glass fiber reinforced tape polyethylene composite pipe according to claim 1, wherein the main structures of the first winding machine and the second winding machine are the same, each comprising a winding machine base, a motor, a large plate, a tooth plate, a straightening press roller set, a bracket, tape feeders, tape guide machines, spring press sheets, hinges, dividing rulers, clamping rollers and signal transmitters, the motor is arranged at the bottom of the winding machine base of a U-shaped structure, the large plate which is of a circular plate-shaped structure is erected between the two ends of the winding machine base, the tooth plate is arranged on the outer edge of the large plate, the motor and the tooth plate are meshed together and the motor drives the tooth plate to rotate, the straightening press roller set which is of a ring-shaped structure is arranged at the center of the large plate, the straightening press roller set is composed of round rollers and the number of the circular rollers depends on the number of composite tapes wound at the same time, the straightening press roller set clamps and straightens the inner pipe and presses the composite tapes wound on the inner pipe so that the composite tapes are wound tightly on the inner pipe, one end of the straightening press roller set is connected to the ground through the bracket, there are 2-12 tape feeders and 1-6 tape guide machines arranged on the circumference of the large plate at equal intervals, every two of the tape feeders and one tape guide machine work together to form a tape feeding and guiding module; when one of the two tape feeders in each tape feeding and guiding module is running, the other one is on standby, the tape feeders are vertically connected with the large plate and two spring press sheets which are symmetrical in structure are arranged at the front end of each tape feeder, when the composite tapes are placed on the tape feeders, the spring press sheets are tightly pressed by the composite tapes and then fix the composite tapes on the tape feeders, in the case of a replacement of the composite tapes, the empty composite tapes press the spring press sheets flat, which facilitate the easy removal of the empty composite tapes from the tape feeders, after new composite tapes are placed on the tape feeders, the spring press sheets are in a pressed state and fix the composite tapes on the tape feeders, a signal transmitter is arranged at the end of each tape feeder and the tape guide machines are connected with the large plate through the hinges with the dividing rulers arranged on the large plate at the positions connected with the tape guide machines, the scales on the dividing rulers correspond to the tilt angles of the tape guide machines, which facilitate the adjustment of the angles between the tape guide machines and the large plate, the tilt angles of the tape guide machines are selected according to the winding angles of the composite tapes, two clamping rollers which are symmetrical in structure are arranged on each tape guide machine and used to clamp the composite tapes, the clamping rollers are in a clamping state in the process of automatic replacement of the composite tapes.

3. The continuous production device for a glass fiber reinforced tape polyethylene composite pipe according to claim 2, wherein the first heater and the second heater have the same main structure and both have heating and cooling functions, infrared heating is used during heating, and a cold air blower is used during cooling, the first heater and the second heater are in a heating state in the production process and after the production is completed, the first heater and the second heater stop heating and start cooling, so that the surfaces of the first heater and the second heater and pipelines are cooled to room temperature to prevent the problem where the inner pipe staying in the first heater, the second heaters and the pipelines collapse under a high temperature environment, resulting in the inner pipe being unable to continue to be used or even causing a fire.

4. The continuous production device for a glass fiber reinforced tape polyethylene composite pipe according to claim 3, wherein the main structure of the automatic tape replacing manipulator comprises a base plate, a lower rail, a lower slider, an upright, a bracket, an upper slideway, an upper slider, a connecting shaft, a gripper and a signal receiver, the two base plates which are of a rectangular plate shape are fixedly connected by the lower rail which is of a rectangular strip structure, the signal receiver is arranged on one of the two base plates; the lower slider which is of a rectangular hollow structure is connected to the lower rail in a sleeving manner, the lower slider moves horizontally on the lower rail; the top of the lower slider is provided with the upright which is of a cylindrical hollow structure, one edge of the bracket which is of a rectangular strip structure is nested inside the upright, the bracket rotates in the upright and the other end of the bracket is vertically connected with the upper slideway which is of an L-shaped strip structure, the upper slider which is of a rectangular hollow structure is connected to the upper slideway in a sleeving manner and the upper slide moves horizontally on the upper slideway, the bottom of the upper slide is provided with the connecting shaft which is of a cylindrical structure, one end of the connecting shaft is provided with the gripper which is of an arc-shaped structure, the connecting shaft and the gripper rotate about the upper slider serving as a fulcrum.

5. The continuous production device for a glass fiber reinforced tape polyethylene composite pipe according to claim 4, wherein the first extruder and the outer pipe extruder are both single-screw extruders, the first winding machine, the first heater, the second winding machine, and the second heater are set according to the number of winding layers; when the number of winding layers is 2, a first winding machine, a first heater, a second winding machine, and a second heater are sequentially arranged, when the number of winding layers is 4, a first winding machine, a first heater, a second winding machine, a second heater, a third winding machine, a third heater, a fourth winding machine, and a fourth heater are sequentially arranged; and the winding machines and the heaters are arranged in the same pattern when the number of winding layers is 6, 8, and 10, respectively and the winding directions of the adjacent winding machines are opposite, the outer pipe extrusion die is directly connected with the outer pipe cooling shaping die, so that the glass fiber reinforced tape polyethylene composite pipe is directly shaped in the outer pipe cooling shaping die and further cooled in the second cooling spray box, and the inner diameter of the outer pipe extrusion die is 1-3 mm larger than the inner diameter of the outer pipe cooling shaping die, so that the glass fiber reinforced tape polyethylene composite pipe is compacted in the outer pipe cooling shaping die, and the composite effect of the glass fiber reinforced tape polyethylene composite pipe is enhanced.

6. A method for continuous production of a glass fiber reinforced tape polyethylene composite pipe by using the device according to claim 5, wherein the process totally comprises four steps: inner pipe extrusion molding, continuous winding of the composite tape, outer pipe extrusion cladding, and cutting and warehousing:

(a) inner pipe extrusion molding: the first extruder extrudes an inner pipe under the condition that the temperatures of four heating zones are 100° C., 130° C., 150° C. and 170° C., respectively, the nose temperature is 170° C., and the extrusion speed is 0.5-3m/min; the inner pipe is successively subjected to the molding of the inner pipe die, the sizing of the vacuum sizing box and the cooling and shaping of the first cooling spray box, it then enters the first winding machine under the traction of the first tractor, wherein the traction speed of the first tractor is matched with the inner pipe extrusion speeds of the first extruder and the inner pipe die;

(b) continuous winding of the composite tape: the first winding machine winds the first layer of the composite tape at the periphery of the inner pipe at a winding angle of 54°-63°, and then the inner pipe is heated by the first heater so that the first layer of the composite tape and the inner pipe are fused together, then, the second winding machine winds the second layer of the composite tape in an opposite direction at the periphery of the first layer of the composite tape at a winding angle of 54-63° and then the inner pipe is heated by the second heater so that the second layer of the composite tape and the first layer of the composite tape and the inner pipe are fused together, and the inner pipe wound with the composite tape enters the outer pipe extrusion die;

wherein in the process of winding the composite tape, a backup composite tape are placed on a standby tape feeder, when the composite tape on a tape feeder is about to be used up, the signal transmitter sends a tape replacement signal and the signal receiver on the automatic tape replacement manipulator receives the tape replacing signal, when the horizontal distance between the signal transmitter and the signal receiver is 2-4m, the automatic tape replacing manipulator starts working, the gripper holds the backup composite tape, the lower slider slides along the lower rail, and the bracket rotates counterclockwise for 90° along the axis of the bracket, so that the axis of the backup composite tape held by the gripper coincides with the axis of the tape feeder; after the upper slider moves 200 mm along the upper slideway, the gripper places the backup composite tape on the tape feeder, and then the composite tape is pulled out from a tape roll and attached to the backup composite tape, the overlapping portion of the composite tape and the backup composite tape is greater than half of the circumference of the inner pipe; the signal transmitter stops transmitting the tape replacement signal and the automatic tape replacing manipulator comes back to the original position and stops working, thus completing the automatic replacement of the composite tape and achieving continuous winding of the composite tape, where the number of winding layers of the first winding machine and the second winding machine are both 2, 4, 6, 8 or 10, the number of winding layers are selected according to the pressure level, the winding directions of the adjacent winding layers are opposite and the number of winding machines depends on the number of winding layers, the number of composite tapes wound on a winding machine simultaneously is calculated according to the formula $n=(\pi \times D \times \cos \alpha)/L$, where n represents the number of composite tapes wound on the winding machine simultaneously, D represents the outer diameter of the inner pipe, and L represents the width of the composite tape, and $\alpha$ is the winding angle, the tape replacement speed of the automatic tape replacement manipulator matches the winding speeds of the first winding machine and the second winding machine so that the automatic tape replacement manipulator exactly completes the replacement of the composite tape when the large plate is rotated to the corresponding position;

(c) outer pipe extrusion cladding: the outer pipe extruder extrudes an outer pipe under the condition that the temperatures of the four heating zones are 100° C., 130° C., 150° C. and 170° C., respectively, the nose temperature is 170° C., and the extrusion speed is 0.5-3m/min; the outer pipe extruded by the outer pipe extruder is clad with the wound and melted inner pipe in the outer pipe extrusion die, the outer pipe, the glass fiber layer and the inner pipe are melted to form a fully fusion-bonded type glass fiber reinforced tape polyethylene composite pipe, the glass fiber reinforced tape polyethylene composite pipe in turn undergoes the compression, cooling and shaping of the outer pipe cooling shaping die and the further cooling and shaping of the second cooling spray box and then enters the meter counter under the traction of the second tractor; and (d) cutting and warehousing: the fixed length cutting machine cuts the glass fiber reinforced tape polyethylene composite pipe according to a set length and data metered by the meter counter, and the cut glass fiber reinforced tape polyethylene composite pipes are then transferred to and stacked orderly on the finished pipe racks in a warehouse and proper protective measures are carried out.

7. The continuous production method for a glass fiber reinforced tape polyethylene composite pipe according to claim 6, where the glass fiber reinforced tape polyethylene composite pipe prepared by the method comprises an inner pipe, a reinforcement layer and an outer pipe, and the inner pipe and the outer pipe are both made of polyethylene, and the thickness and width of the reinforcement layer are 0.8-8 mm and 100-300 mm, respectively, the reinforcement layer is formed by winding and compositing the glass fiber-reinforced polyethylene composite tapes, the glass fibers in the composite tapes are bundled continuous long glass fibers and the strength of each bundle of glass fibers is greater than 0.5N/dTEX, the retention of the strength of each bundle of glass fibers is greater than 90%, the continuous long glass fibers are treated with a coupling agent, the glass fiber monofilaments are bonded to each other and the glass fiber is bonded to the polyethylene.

* * * * *